United States Patent [19]

McGrew

[11] Patent Number: 4,726,176

[45] Date of Patent: Feb. 23, 1988

[54] ROTARY MOWER CUTTER MEANS

[76] Inventor: David L. McGrew, 2509 College Ave., Terre Haute, Ind. 47803

[21] Appl. No.: 791,466

[22] Filed: Oct. 24, 1985

[51] Int. Cl.[4] .......................... A01D 34/84; A01G 3/06
[52] U.S. Cl. ........................................ 56/12.7; 56/295; 30/276
[58] Field of Search ...................... 56/12.7, 295, 17.5; 30/276, 347

[56] References Cited

U.S. PATENT DOCUMENTS

| | | | |
|---|---|---|---|
| 4,043,037 | 8/1977 | Okamoto et al. | 56/12.7 |
| 4,054,992 | 10/1977 | Ballas et al. | 56/12.7 |
| 4,062,115 | 12/1977 | Lee | 56/12.7 |
| 4,089,114 | 5/1978 | Doolittle et al. | 56/12.7 |
| 4,137,694 | 2/1979 | Hopper | 56/12.7 |
| 4,190,954 | 3/1980 | Walto | 56/12.7 |
| 4,199,926 | 4/1980 | Petty | 56/12.7 |
| 4,238,866 | 12/1980 | Taylor | 56/12.7 |
| 4,268,964 | 5/1981 | Moore | 56/12.7 |
| 4,461,138 | 7/1984 | Whitman | 56/12.7 |
| 4,513,563 | 4/1985 | Roser et al. | 56/12.7 |

*Primary Examiner*—John Weiss
*Attorney, Agent, or Firm*—Robert A. Spray

[57] ABSTRACT

For a rotary lawn mower, a cutter means provides an attachment or original equipment, providing novel means of carry of flexible strips which provide cutter elements, the strips being easily mounted in the cutter body, and the mounting of the cutter body onto the mower's drive shaft providing an automatic means of holding the filaments strips to the cutter body.

2 Claims, 7 Drawing Figures

ROTARY MOWER CUTTER MEANS

FIELD AND BACKGROUND OF THE INVENTION

The present invention relates to lawn mowers, and more particularly to power lawn mowers of so-called "rotary type" in which a vertical drive shaft carries some type of cutter elements or strands which spin rapidly in a horizontal plane to achieve grass-cutting.

Even more particularly, the present invention relates to and achieves an advantageous cutter body having novel concepts for providing the carry of the cutter strands for such a mower in a novel way, providing advantages over other means of carrying the cutter strands.

The novel concepts, relating to the mounting and the carry of the cutter strips, are thus applicable to any type of mower, i.e., hand-pushed, riding-type mowers, and even hand-carried devices; for all require some sort of body member to carry the cutter strips and to impart to them the rapidly spinning motion of a powered drive shaft to achieve the desired mowing and/or trimming operativity.

PRIOR ART

Although rotary lawn mowers first appeared decades ago with rigid metal cutter blades, and indeed rigid metal blades as cutters for rotary mowers are still in use today, many years ago it was found that flexible filament strips or strands provided an advantageous cutter element; for although the strips are flexible they gave safety and other advantages over rigid cutter blades, and although flexible they are able to act sufficiently rigid for grass-cutting operativity by the dynamic effects of rotary inertia and centrifugal forces which are an incident to their rapidly revolving motion.

Thus, it is of course not only conceded but emphasized that rotary mowers are long known and used in the prior art, even rotary lawn mowers having flexible strips as the cutter elements; for that widespread knowledge and use, especially coupled with the familiarity of such devices to worldwide millions of persons for many years, helps to show the nature of the present concepts as being those of inventive novelty.

And the inventive nature of the present concepts is especially to be seen in a realistic consideration of the special differences of these particular concepts over the basic idea of flexible strips serving as the cutting components, together with a realistic consideration of the novelty and advantages of the present concepts which provide for the special and convenient mounting and carry of the flexible cutter strips for this type of mower.

SUMMARY OF THE INVENTIVE CONCEPTS

According to basic concepts of the present invention, the mounting and carry of the flexible cutter strips for the mower device is provided by a rotor disk having special features of radially-extending carrying holes and a central recess, the carrying holes being open to the central recess. The central recess is the portion of the disk which is operatively engaged by the bolthead or nut which affixes the rotor disk onto the drive shaft, or by a shoulder of the drive shaft, depending on which side of the rotor disk the user mounts inwardly. (For illustrating the invention, it is here assumed that the assembly is that of the central recess facing outwardly.)

This arrangement provides for ease of mounting or assembly of the cutter strips to the rotor disk; for each of the cutter strips are easily pushed through a pair of the carrying holes, and the strips are thus quite securely retained onto the disk by two means.

That is, the strips are held by the force of their resilient deformation caused by the non-colinearity of the two carrying holes through which each of the cutting strips passes, that non-colinearity being accommodated by a bend of the strips in the central recess. Thus, there is an automaticness of the achievement of that aspect of the strip-carry operativity.

The other aspect of the strip-carry operativity is also automatically achieved; for that is the force exerted on the strip-portion in the central recess, as an automatic incident to the mounting of the rotor disk on the machine's drive shaft, for the compressive force of that mounting automatically passes through the central-recess portion of each cutter strip.

Thus, strip-retention is not only easy and very secure, providing for ease and "sure-proofness" of assembly and change of strips as they become worn, but it is achieved automatically in two respects as noted.

BRIEF DESCRIPTION OF THE DRAWINGS

The above description is generally of introductory nature; and more particular details, features, and concepts will be further apparent from the following more-detailed description of embodiments illustrating the inventive concepts, considered with the accompanying drawings. In the drawings, which are somewhat schematic or diagrammatic for illustrating the concepts, the various Figures of the drawings are as follows.

DETAILED DESCRIPTION OF ILLUSTRATIVE EMBODIMENTS

Figure 1:
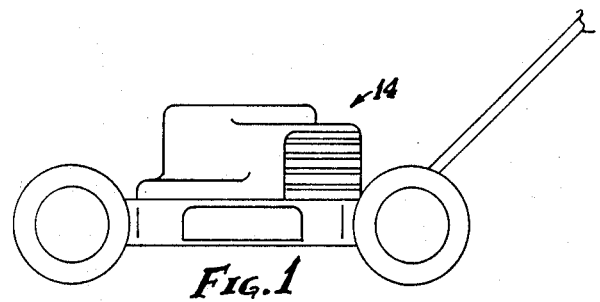
FIG. 1 is a side elevational sketch view of a typical or conventional rotary lawn mower onto which a cutter means of the present invention may be installed.

As shown in the drawings, the invention provides a body member means 10 for mounting on a rotary powered drive shaft 12 of an associated power tool 14, for the providing of an advantageous cutter means for the cutting and mulching of grass or other vegetation.

Except for the flexible filaments or cutter strips 16 and the mounting components described below, the entire operative body of the present invention is provided by advantageous features of a rotor disk 18. As shown in all the views, it is a flat and fairly thin body member generally circular in overall form, and is symmetric and well-balanced for avoiding any dynamic unbalance, for it is driven at a high revolving speed by the mower's power shaft 12; and, depending on the nature of the particular mower's drive shaft 12, the rotor disk 18 provides for various natures of mounting means 19 for mounting the disk 18 onto the mower's rotary drive means 12.

The conceptual details of the disk 18, and its various and optionally usable provisions for mounting onto the mower's drive shaft 12, are now described in detail, together with the strips 16 and the concepts which provide their carry by the disk 18.

It is to be first noted that the disk 18 is provided with a central recess 20 in a face thereof, it being desirably the lower face 22, and the disk 18 is also provided (FIG. 3) with a plurality of generally radially-extending opening means 24, which open into and extend from the inner wall 25 of the central recess 20 generally radially outwardly, and open outwardly at an outlet or outer opening 26 of the disk's outer periphery surface 27. (The openings 24 are not necessarily fully straight passages and not necessarily radial, in the strict geometric sense as shown, although desirably they are.)

The actual chopping and mulching is accomplished by the cutter strips 16. These are of a tough and long-lasting material, such as nylon; and they provide flexible strip means 16 which are passed through a first one of the opening holes 24 and through the central recess 20 and through a second one of the opening holes 24. It is the central portion 28 (FIG. 3) of the strip means 16, i.e., the strip-portion 29 disposed in the recess 20 and between the strip-portions 30 which reside in the disk-holes 24, together with those strip-portions 30 residing in the disk-holes 24, which is retained by the disk 18 during its powered rotation as caused by the tool's rotary drive means 12; and the end portions 32 of the strip means 16 which extend outwardly of the periphery 27 of the disk 18 are the strip-portions which provide the vegetation-engaging cutting and mulching operativity as to the grass or other vegetation.

Although, as stated above, the concepts do not require the disk-holes 24 to be strictly straight or strictly radial, it is a desired characteristic that of the two holes 24 of reception of a single one of the strips 16, they are non-colinear for at least some portion thereof; and, it is a desired characteristic, although the strips 16 are flexible, that they possess some rigidity. This provides that a portion of the retention of the flexible strip means 16 by the disk 18 is provided by the flexible strip means 16 being given resilient deformation in the central portion 28 thereof, by the bending of the central portion 28 of strip 16 to achieve the non-colinear disposition of the central portion 28 of the strip 16.

It is to be further noted (FIGS. 4 and 6) that the disk 18 is provided with an opening 34 extending fully through the disk 18 in the region of the central recess 20; and this disk-hole 34 accepts whatever is the nature of the bolt means 36 which interconnects the disk 18 to the mower's drive shaft 12, i.e., whether the bolt means 36 includes a male-threaded drive shaft end 38 (FIGS. 2,3, and 4) in which embodiment the drive shaft 12 has a male-threaded end 38, or the bolt means 36 includes a holding bolt 40 (FIG. 6) in which embodiment the drive shaft 12 has a female-threaded end 42.

With the former (FIGS. 2,3, and 4), a nut 44 is used, and with the latter (FIG. 6) the bolt 40 includes a bolt-head 46, both the nut 44 and bolthead 46 being considered as equivalents as a tightenable nut means.

Figure 2:
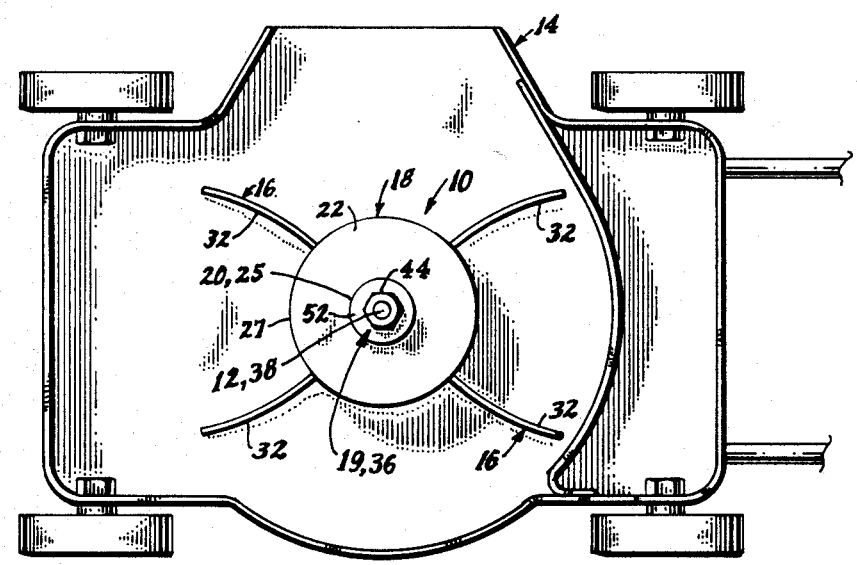
FIG. 2 is bottom view of such a rotary lawn mower, showing the cutter means device of this invention installed on the mower's rotary drive or power shaft.
Figure 3:
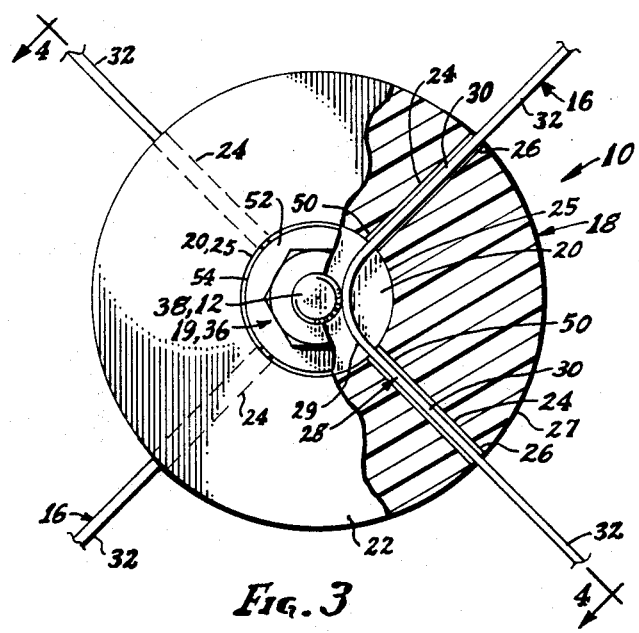
FIG. 3, in enlarged scale, is a bottom view of the device's body member means which provides the rotor disk which is affixed to the mower's drive shaft and carries the flexible filaments or strips which, as given the rotary inertia and centrifugal force effect of the mower's rotary drive shaft are operative to chop and mulch the grass or other vegetation to be cut, the rotor disk being shown as partially cut away by draftsman's convention to illustrate interior details, and showing the lower end of the mower's drive shaft and the connection thereto.
Figure 4:
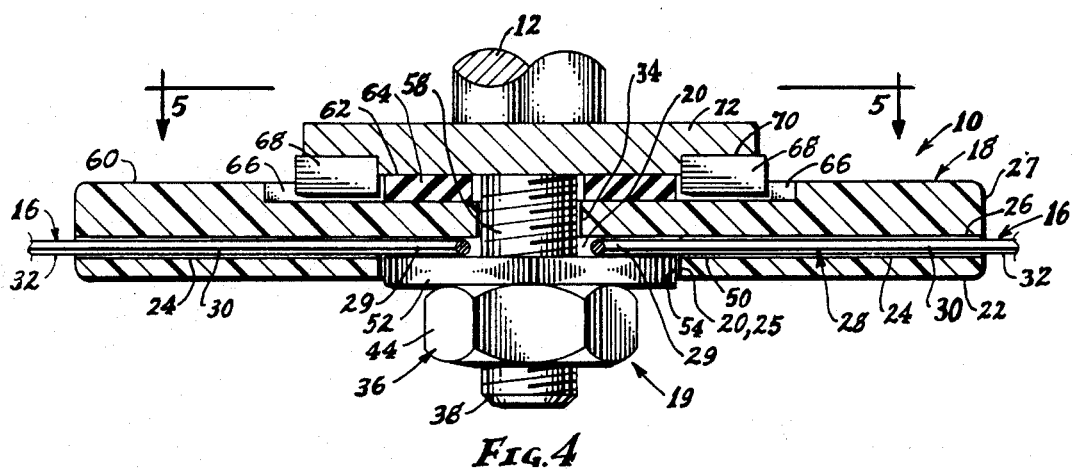
FIG. 4 is a vertical cross-sectional view, in considerably enlarged scale, generally as taken by Section-line 4—4 of FIG. 3, of the assembly of rotor disk and flexible strips, the disk being shown mounted on a mower drive shaft having a male-threaded lower end.
Figure 5:
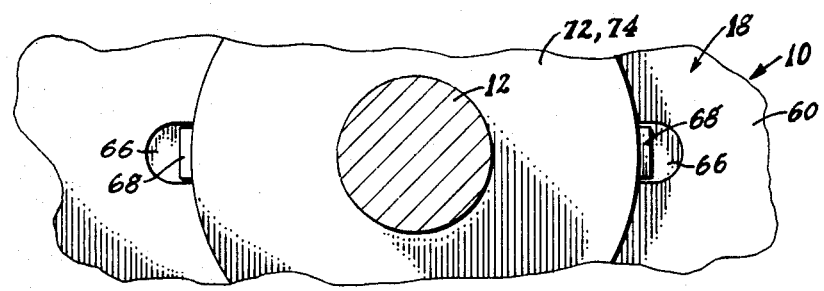
FIG. 5 is a plan view, fragmental in nature, of the rotor disk of FIG. 4, shown generally as taken by Section-line 5—5 of FIG. 4.
Figure 6:
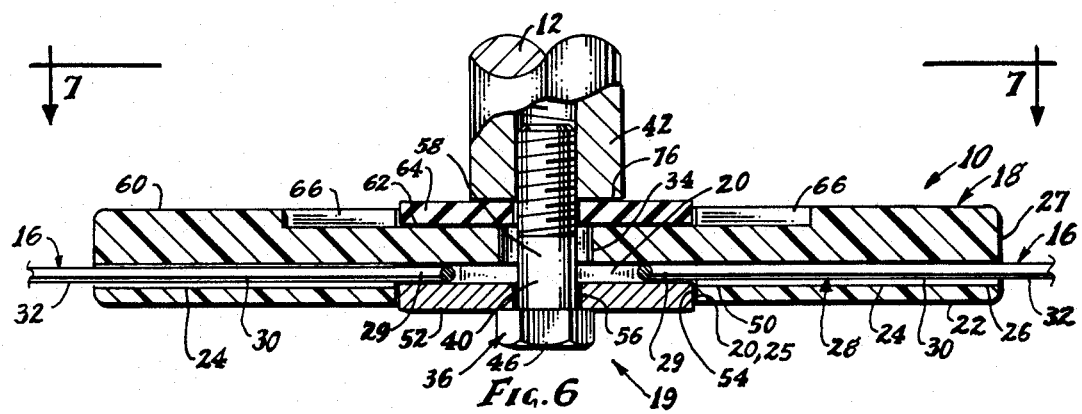
FIG. 6 is a vertical cross-sectional view, similar to FIG. 4, but showing the rotor disk mounted on a drive shaft having a female-threaded lower end.
Figure 7:
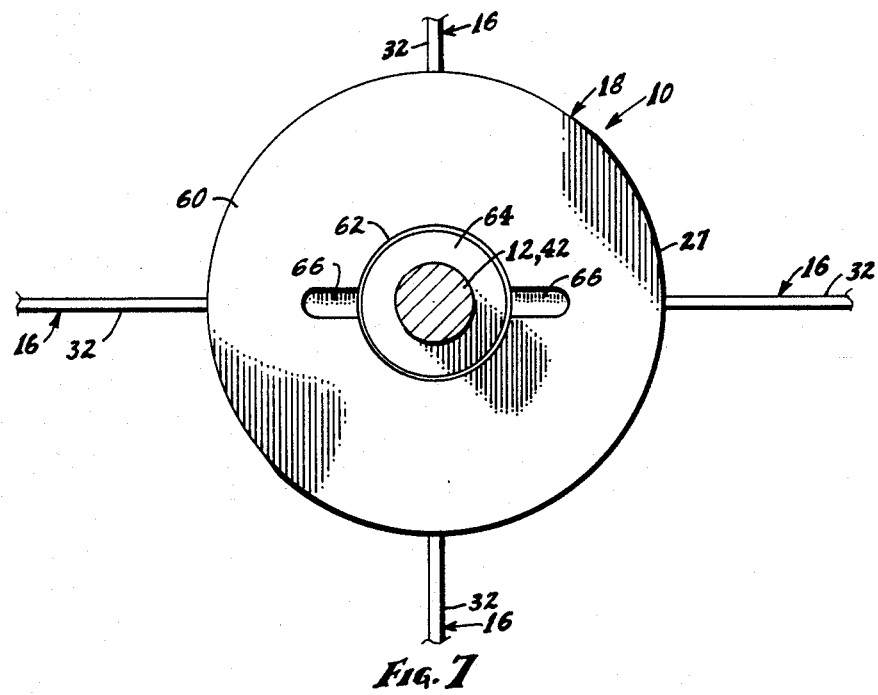
FIG. 7, in the smaller scale of FIG. 3, is a plan view of the rotor disk of FIG. 6, as shown generally as taken by Section-line 7—7 of FIG. 6.

With either embodiment (FIG. 4 or FIG. 6) a group of components or features, i.e., the central recess 20, the adjacent proximity of the central recess 20 to the disk's bolt means opening 34, and the presence of central portions 29 of the flexible strip means 16 in the central recess 20 and along the central wall of the recess 20, all co-operate to provide that whatever is the tightenable bolthead means 46 or nut means 44 of the bolt means 36 of the mounting means 19, which operatively retains the disk 18 to the machine's rotary drive means 12 by the compressive force of the tightenable means (44 or 46) being transmitted to and sustained by the outer end of the rotary drive means 12, that being an axially-directed force, also serves to retain the flexible strip means 16 onto the disk 18 by operatively bearing with force axially with respect to the rotary drive shaft 12, against the portions 29 of the flexible strip means 16 in the central recess 20, and the disk's central wall of the recess 20, as an incident to the tightenable bolthead means 46 or nut means 44 operatively bearing against the disk 18 as an incident of the tightening of the mounting means 19 by relative rotating whatever is the tightening means (44 or 46) of the embodiment, i.e., the bolthead means 46 or nut means 44 of the bolt means 36 of the mounting means 19 of the embodiments respectively shown in FIGS. 2,3, and 4, or in FIG. 6.

As shown in the drawings, the non-colinearity of portions of disk-openings 24 for any one of the strips 16 is provided by the portions 50 of one of the opening means 24 and of the other one of the opening means 24 of reception of a single one of the strips 16, and which open into the central recess area 20, being angularly related at an angle other than 180°, and particularly as shown they are angularly related at an angle of no more than 90°; and specifically the 90° adjacency is desirable as providing a pair of sets of disk-openings 24 which together accommodate two of the cutter strip units 16, there being a flexible strip means 16 for each set of the disk-openings 24.

The invention's embodiments as shown also provided for variations in the diametrical size of the bolt means 36 of the mounting means 19. More particularly in this regard, concepts provide that embodiments of this invention may be used to provide a vegetation-cutting means in installations in which the disk's central opening 34 is larger than the diameter of the bolt means 38 or 40, and thus the loose interfit of the bolt means 38 or 40 in the disk's central opening 34 would be unable to assure concentricity of the disk 18 and the bolt means 38 or 40; for as now described there are provided means to nevertheless assure that concentricity.

As shown, this concentricity-assuring means includes the provision that the inner wall 25 of the central recess 20 is operatively circular, and it and the disk opening 34 are operatively concentric, and there is provided a washer 52 under (inwardly, that is) of bolthead 46 or nut 44, the diameter of the washer 52's outer edge 54 being that of the inner edge 25 of the central recess 20, and the washer 52's outer edge 54 being operatively circular, and the washer 52 has a cutout central portion 56 (FIG. 6) which is operatively circular and concentric with the outer edge 54 of the washer 52 and of the size of the shank 58 of the bolt means 36.

This concentricity-assuring feature or arrangement provides that the concentricity of the central recess 20's inner wall 25 to the disk's central opening 34, and the concentricity of the washer 52's outer edge 54 and its cutout central portion 56, and the fit of the washer 52 into the central recess 20, and the sameness of the size of the washer 52's cutout central portion 56 and the shank 58 of the bolt means 36, all co-operate to provide that with the washer 52 nested in the disk's central recess 20, the sameness of size of the washer 52's cutout portion 56 and the shank 58 of the bolt means 36 (of either embodiment) assures concentricity of the disk 18 with respect to the bolt means 36 of either embodiment.

Washers 52 of the same outer diameter 54 but differing inner diameters 56 may be provided, to accommodate various size bolt means 36; but for reasons given above, all types of washers 52 will have the same outer diameter 54 as that of the central recess inner wall 25, and the washer walls 56 and 54 will be concentric for any single type of washer 52.

The central recess 20 in the lower (outer) disk face 22 is deep enough to accommodate the disk-opening outlets 50 of recess-wall 25, and the strip-portion 29 of central strip-portion 28, and a sufficient amount of the washer 52 to retain its concentricity with the recess-wall 25.

Desirably as shown, the mounting 19 also provides that the upper (inner) face 60 is provided with a central recess 62 which carries a rubber or other resilient washer 64, the compression of which during tightening of the bolthead 46 or nut 44 assures a tight and locking assembly of the cutter device 10 onto the power shaft 12.

The inner central recess 62 is shown as provided with diametrically-opposed radial extensions 66 for the carrying or torque-lugs 68 (FIG. 4) if the installation uses them; and, if used, the lugs 68 would respectively fit partly in the extensions 66 and partly in a downwardly (axially-outwardly) facing recess 70 provided in an inner body or washer 72 which seats against a shoulder 74 of the drive shaft 12. This construction, embodying torque-lugs 68, is shown in FIG. 4; although in FIG. 6 the rubber washer 64 abuts against the extreme end 76 of the female-threaded end portion 42 of the drive shaft 12.

Assembly of the cutter device 10 onto any particular mower's drive shaft 12 depends on the nature and size particulars of the shaft 12 as having a male-threaded end 38 or requiring a bolt 40, etc.; but with the features and components provided as herein described, an installation can be made on most all mower devices 14, for their housing walls 80 (FIG. 2) are quite substantially of larger diameter than the rotor disk 18 which is preferably about only about six inches in diameter, this size providing ample length to the outer portions 32 of the strips 16, which can be snipped to about one-half inch of the housing walls 80.

The disk-recess 20 is about two inches in diameter, and with two sets of disk-openings 24, and with the filament strips 16 formed of about one-eighth inch diameter stock, the filaments 16 can be readily bent to be passed through disk-holes 24.

With either embodiment, the tight mounting of of the cutter unit 10 onto the drive shaft 12 snugly retains the filament strands 16 in place, particularly also by the resilient deformation of the strands 16 in their central portion 28 (including portions 29 and 30), as as detailed herein.

SUMMARY

It is thus seen that a rotary mower cutter means or device, according to various details of the inventive concepts, provides a desired and advantageous device and product of manufacture.

It is easy to use, and, as a particular achievement, provides an easy attachment and change of the filament strips and an automatic retention of them. Further, it provides safety in use by adults and children, is economical, and can be used as an attachment for most all existing rotary mowers as well as provided as original equipment. Replacement costs of the nylon filament strands are minimal. It replaces costly blade sharpening, as well as avoids danger and other disadvantages of cutter blades, and with most vegetation achieves both cutting and mulching.

Accordingly, it will thus be seen from the foregoing description of the invention according to these illustrative embodiments, considered with the accompanying drawings, that the present invention provides new and useful concepts of a novel and advantageous rotary mower cutter means, providing the advantages and utility from various standpoints such as pointed out herein, yielding several desired advantages and characteristics, and accomplishing the intended objects, including those hereinbefore pointed out and others which are inherent in the invention.

Modifications and variations may be effected without departing from the scope of the novel concepts of the invention; accordingly, the invention is not limited to the specific embodiments of form or arrangement of parts herein described or shown; for the drawings and the embodiments set forth are illustrative of the concepts rather than try to indicate all possible variants which are within the concepts.

I claim:

1. Cutter means for a rotary drive means of an associated power tool, for providing for cutting of grass or other vegetation, comprising:

a disk;

mounting means for mounting the disk onto the rotary drive means, and the disk operatively abuttingly engaging an axially outer portion of the rotary drive means when mounted thereon;

the disk being provided with a central recess in a face thereof, and a central wall means facing axially with respect to the rotary drive means when the disk is mounted thereon;

the disk also being provided with a plurality of generally radially-extending opening means opening into and extending from said central recess, and opening outwardly of the disk's periphery;

flexible strip means for being passed through a first one of said opening means and said central recess and a second one of said opening means;

a central portion of the strip means being retained by the disk during its powered rotation as caused by the tool's rotary drive means, and the end portions of the strip means extending outwardly of the disk for cutting operativity as to the grass or other vegetation;

the disk being provided with a central opening adjacent to and extending fully through said central wall means of the disk in the region of the disk's central recess, and the mounting means which mounts the disk onto the rotary drive means includes a bolt means having a shank which, when the disk is mounted on the rotary drive means, extends through the said central opening in the central wall means of the disk, the bolt means having a tightenable means for the portion of the shank of the bolt means extending outwardly of the said central opening in the central wall means of the disk, the bolt means being tightenable by rotation of the tightenable means relative to the tool's rotary drive means;

the tightenable means being operative to hold the disk to the rotary drive means by compressive force axially of the rotary drive means, transmitted through the said central wall means of the disk, and sustained by the rotary drive means, said force being caused by the said tightening of the tightenable means with respect to the rotary drive means and axially directed;

the disk's said central opening and its opening means being shaped such that, when the disk is provided with a flexible strip means passed therethrough as aforesaid and the disk is mounted as aforesaid onto the rotary drive means, the disk's central recess and its central opening position the strip means' central portion in the path of the said axial force transmission through the disk and between the tightenable means and the rotary drive means;

thereby providing that the strip means are caused to be operatively held against the disk's said central wall means and against movement with respect to the disk, both by and as an incident to the tightening of the tightenable means for holding the disk onto the rotary drive means, by the strip means' central portion being imposed with and sustaining axial force transmitted between the tightenable means and the rotary drive means, and thus by the pressing of the strip means' central portion against the said disk means' central wall means;

in a combination in which the disk's said central opening is provided to be of the relatively large diameter of a bolt means' shank of a size relatively larger than the relatively small size bolt means shank mentioned below, for accommodating a relatively large size bolt means' shank to pass therethrough, but, being of that relatively large diameter, the disk's said central opening is larger than the diameter of a relatively small size bolt means shank, and thus in the use of the disk with a bolt means shank of that relatively small size, the loose interfit of the relatively small size bolt means shank in the disk's said central opening is unable to assure concentricity of the disk and the relatively small size shank of that bolt means; and there being means to provide that concentricity, including the provision that the disk's central recess is operatively circular, and the disk's central recess and the said disk's central opening are operatively concentric, and the provision of an extra-effect washer, the said washer having a central opening for acceptance of the bolt means therethrough, a surface radially extending therefrom, and an outer edge which provides an outwardly-facing abutment;

the diameter of the said extra-effect washer's outer edge abutment being that of the disk's central recess, and the said washer's outer edge abutment is operatively circular, and the said washer's said central opening being operatively circular and concentric with the outer edge abutment of the said washer, and of the size of the shank of the relatively small size bolt means;

the arrangement providing that the concentricity of the disk's central recess to the disk's central opening, and the concentricity of the washer's said outer edge abutment and its said central opening, and the same-diameter fit of the said washer into the disk's central recess, and the sameness of the size of the washer's said central opening and the shank of the relatively small size bolt means, all co-operate to provide that with the washer nested in the disk's central recess, the sameness of size of the washer's said central opening and the relatively small size bolt means' shank assures concentricity of the disk with respect to the relatively small size bolt means shank, the said washer thus providing the extra function of the said washer's radially-extending surface not only providing a bearing wall for operatively pressing against the strip means portions in the disk's central recess as an incident to the tightening of the tightenable means, but also carrying the said washer's outer edge abutment, the said extra-effect washer's edge abutment and its central opening concentric thereto providing the size adapter and concentricity functions specified, in co-operation with the said disk and its said central recess.

2. The invention as set forth in claim 1 in a combination in which the tightenable means is operative to retain the flexible strip means onto the disk, by operatively bearing, or causing the operative bearing by a portion of the rotary drive means, depending upon whether the disk is mounted so that the central recess and its said central wall means faces outwardly or inwardly with respect to the axis of the rotary drive means, against the central portions of the flexible strip means in the central recess which lie along the disk's said central wall means, as an incident to operatively bearing against the disk's said central wall means as an incident of the tightening of the mounting means by relatively rotating the tightenable means of the mounting means, the said extra-effect washer providing a portion of the tightenable means.

* * * * *